Nov. 22, 1966  C. H. TUCKEY  3,286,873
FUEL TANK CAP
Filed June 1, 1964
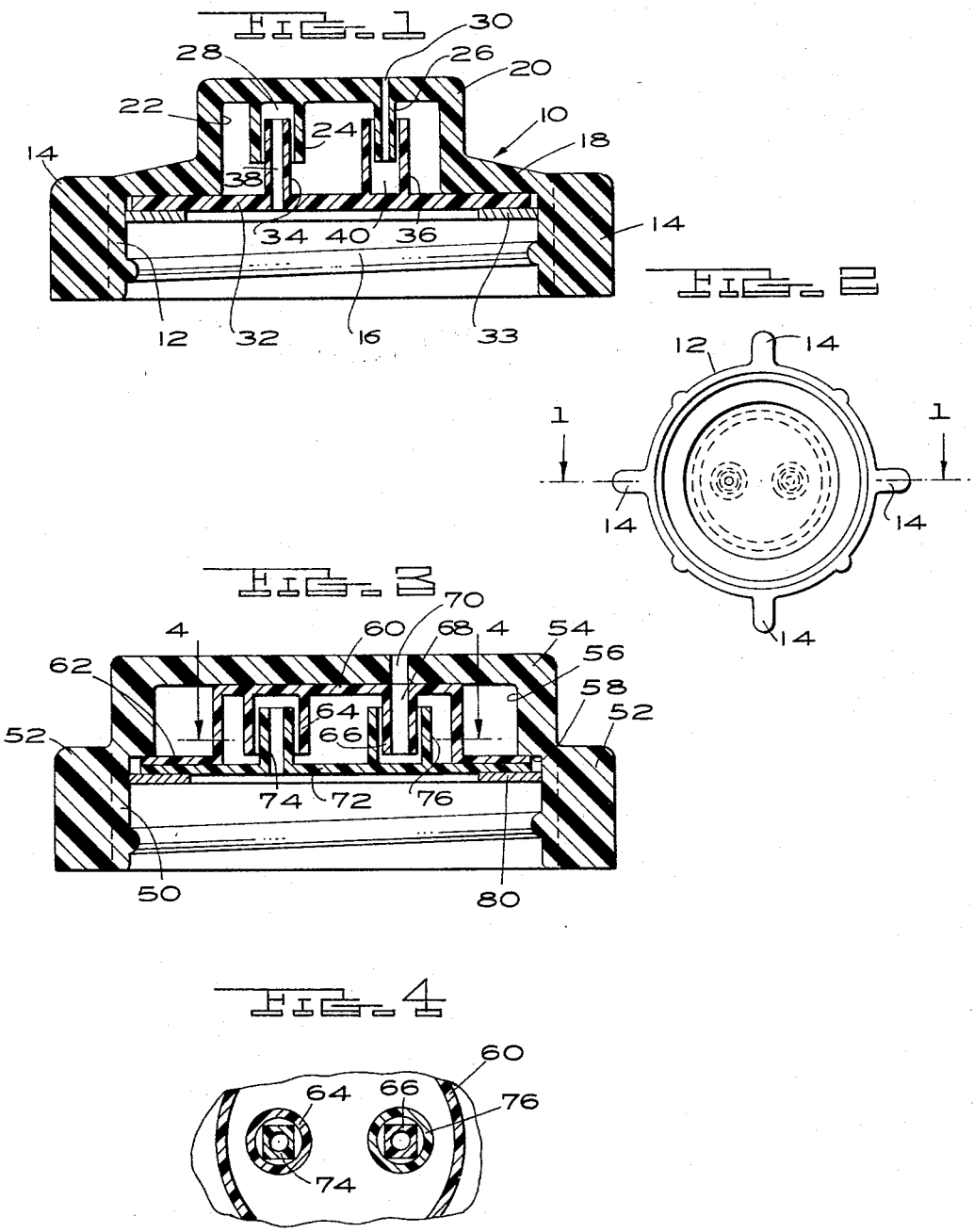
INVENTOR
CHARLES H. TUCKEY
BY
Barnes, Kisselle, Raisch & Choate
ATTORNEYS

United States Patent Office 3,286,873
Patented Nov. 22, 1966

3,286,873
FUEL TANK CAP
Charles H. Tuckey, Cass City, Mich., assignor to Walbro Corporation, Cass City, Mich., a corporation of Michigan
Filed June 1, 1964, Ser. No. 371,486
5 Claims. (Cl. 220—44)

This invention relates to a fuel tank cap and is primarily for use with gas storage containers used on portable devices such as lawn mowers, go-carts, chain saws and the like.

The purpose of the invention is to improve gas cap construction and more particularly to provide an improvement on a gas cap of the type which is intended to vent the gas tank to atmospheric pressure, thus compensating for expansion and contraction of the volume of gas in the tank due to heat changes and also to prevent vapor lock due to a reduction of atmospheric pressure in the tank above the gas level. Reference is made to my co-pending application Serial No. 204,326, filed June 22, 1962, now Patent No. 3,140,794, issued July 14, 1964, wherein a gas cap of the general construction is disclosed.

The present invention is related to an improved construction wherein formation of the cap is facilitated by the integral parts which are fashioned in the manufacture of the device.

It is an object of the invention to provide a relatively inexpensive and simple gas cap construction which is simple in the matter of the shape of the parts as well as the assembly thereof.

It is a further object of the invention to provide a construction which is attachable to various size caps of individual manufacturers wherein the internal portions of the cap may be fashioned in a standard size and be suitably received in various caps of different size.

Other objects and features of the invention relating to details of construction and operation will be apparent in the following description and claims.

Drawings accompanying the disclosure and the various views thereof may be briefly described as:

FIGURE 1, a sectional view on line 1—1 of FIGURE 2 of the gas cap made according to the present invention.

FIGURE 2, a top view of an assembled cap as shown in FIGURE 1.

FIGURE 3, a sectional view of a modified structure utilizing the principles of the invention.

FIGURE 4, a sectional view on line 4—4 of FIGURE 3.

Referring to the drawings:

In FIGURE 1, a gas cap housing 10 is shown as a molded plastic part having a cylindrical skirt portion 12 provided on the outer surface with lugs 14 to facilitate tightening. On the inside of the skirt 12 is a thread 16 or some equivalent device for screw-locking the cap in place in sealed relation to a gravity fill opening of a tank. The cap has an annular radial portion 18 inward from the skirt which terminates at a central dome 20 having a substantially cylindrical recess 22. On the inner top surface of the dome forming the recess 22 are integrally formed two hollow annular projections which may be referred to as tubes 24 and 26, the tube 24 forming a recess 28 and the tube 26 forming a recess 30, the latter recess continuing through the top wall of the dome to connect the outside atmospheric air to the interior of the recess 22.

Within the gas cap is a circular disc-like plate 32 which is received against the bottom wall of the radial portion 18 of the cap and held in place by a ring 33 which is pressed into the recess formed by the cylindrical skirt portion 12 and frictionally held in place by contact with the interior walls. On the top surface of the disc 32 are two hollow annular projections which may be referred to as tubes 34 and 36. The tube 34 has a recess 38 which continues through the wall of the disc 32 to expose the interior of the cap to the recess 28.

The interior of the tube 36 forms a recess 40 which connects with the recess 30 in tube 26. It will be seen that in assembly the tube 34 telescopes into the recess 28 of tube 24 to a point toward the top of the dome 20 and at the same time the parts are so positioned that the tube 26 will telescope into the recess 40 of tube 36. The walls of the disc 32 are sealed against the interior of the cap 10 by the pressure of the sealing ring 33 which not only serves to lock the disc in place but also as an annular contact ring for the neck of a tank projection threaded to receive the cap.

The recess 22 is accordingly not open to atmosphere except through the sinuous passage which originates at the recess 30, moves to the recess 40, and then through the space between the outer walls of tube 26 and the inner walls of tube 36. This admits atmosphere to the recess 26 within the dome 20 and this atmosphere may then pass through the space between the inner walls of tube 24 and the outer walls of tube 34 to the recess 28 and then through the recess 38 to the interior of the cap 10. The spacing of the walls of the tubes is such that it is preferable that the projections be centered relative to each other but any off-center relationship will not interfere with the function.

It will thus be seen that the atmosphere may pass into a gas tank and out of it through the sinuous passage made up of recesses 38, 28, 22, 40 and 30. Should gasoline accidentally be moved into recess 22 through passage 38, it will be difficult for it to reach the passage 30 because of the relationship of the tube 26 and the tube 36. Also upon a lowering of pressure in the tank due to a decrease in the gas content or to a cooling effect, any gas in the bottom of the recess 22 will be sucked up into the recess 28 and back into the tank through the passage 38. Thus, with a very simple construction, the object of the invention to prevent spewing of gas from a gas tank cover vent is accomplished.

In FIGURE 3, a modified structure is shown wherein a cartridge type or insert type of unit is devised for use with the gas caps of different sizes which may be developed by various gas cap manufacturers. Taking the gas cap shown in FIGURE 3 as an example, it has a cylindrical skirt portion 50 having tightening studs or tabs 52. The top portion of the cap forms a dome 54 having an inner recess 56. A small shoulder 58 at the bottom of the dome will serve as a location for the parts to be described.

The first part consists of a hat-shaped, sub-dome 60 having an annular brim portion 62. This dome has a depending annular projection tube 64 spaced from a similar annular tube 66, the latter projection having a central recess 68 which can match with an atmospheric opening 70 in the top of the dome 54. Co-operating with these parts to form an enclosed chamber is a disc-shaped plate 72 having an upward hollow tube projection 74 which telescopes with clearance into the tube projection 64 and a slightly larger upward hollow projection 76 which telescopes, with clearance, around the depending tube 66. These parts are all held in place by a sealing ring 80 which overlies the edges of the plate 72 and the brim portion 62 to hold them against the shoulder 58 and to seal them in this position by reason of frictional engagement with the inner walls of the skirt portion 50. In this construction, the annular recess around the sub-dome 60 within the recess 56 is not functional. It will be seen that the same type of sinuous path for the atmospheric transfer is found in the assembly of FIGURE 3 as described in connection with FIGURE 1.

As shown in the sectional view of FIGURE 4, the two parts in FIGURE 3 can be related to each other by forming the walls of the tube projections 66 and 74 with a square outer cross section and with a passage interiorly thereof. Thus, the corners of the square projections can locate the telescoping parts relative to each other and still not interfere with the passage of liquid or air through the intended sinuous path. This simplifies the location of the parts particularly in a cap which does not have an exact fit with the sub-assembly. The advantage of the structure shown in FIGURE 3 is that the parts for forming the critical passages can be preformed for at a number of different dimensions and then the size of the disc 72 and the brim portion 62 can be trimmed to provide suitable location within any particular gas cap.

I claim:
1. A vent cap for closing a vent opening of a container for liquids comprising:
    (a) a body having a portion for co-operation with a gravity fill opening in the top of a container wherein the head space of the container is exposed to the interior of the cap in a liquid tight connection,
    (b) a portion defining an axially extending air chamber in the body, having formed thereon spaced hollow projections one of which is open to the atmosphere through the top wall of said cap, and a separable insert in said cap having a base annularly sealed interiorly against the walls of said cap and having upwardly projecting hollow portions telescopingly related to the hollow projections of said cap, one of said latter projections having an opening extending through said plate whereby to form a sinuous passage from the interior of said cap to the exterior thereof through respective pairs of telescoping projections.

2. A vent cap for closing a vent opening of a container for liquids which comprises:
    (a) means forming a cap body to have engagement with a gravity fill opening in a container wherein the head space of the container is exposed to the interior of the cap in a liquid tight connection,
    (b) means in said body to form a recess having axial and radial extent in said cap,
    (c) two pair of telescoping tubes on said cap in said recess extending generally axially of said cap, the interior of each pair being connected to said recess and, each pair respectively, being connected with the interior of said cap and the exterior thereof, said tubes in each pair being dimensioned to provide clearance between the exterior of the inner tube and the interior of the outer tube.

3. A vent cap for closing a vent opening of a container for liquids which comprises:
    (a) means forming a hollow cap body to have engagement with a gravity fill opening in a container wherein the head space of the container is exposed to the interior of the cap in a liquid tight connection,
    (b) a first pair of tubes depending from the top of said hollow cap body, one of which is open through said top to atmosphere,
    (c) means enclosing a portion of said hollow cap below the top thereof to form a recess in said cap, said means having a second pair of tubes upstanding thereon to telescopically relate with said first pair of tubes, one of the tubes of said second pair being open to the interior of said cap below said recess,
    (d) said telescoping tubes being shaped to provide clearance between the exterior of the inner tube and the interior of the outer tube.

4. A vent cap as defined in claim 3 in which the means enclosing a portion of the said hollow cap comprises a plate engaged in sealing relation at its periphery with the interior of said cap.

5. A vent cap for closing a vent opening of a container for liquids which comprises:
    (a) a cap forming a recess open at the bottom and having side walls to engage with a gravity fill opening in a container wherein the head space of the container is exposed to the interior of the cap in a liquid tight connection,
    (b) a venting insert for said cap comprising a housing enclosing a chamber, said housing having top and bottom walls and being receivable in said cap recess,
    (c) a first pair of tubes projecting downwardly from said top walls, one of said tubes being open to atmosphere through said top wall, a second pair of tubes projecting upwardly from said bottom wall, each tube of said second pair being in telescopic relation with a tube of said first pair and one of said tubes of said second pair being open to the interior of said cap below said chamber,
    (d) said telescoping tubes being disposed to provide clearance between the exterior of the inner tube and the interior of the outer tube.

References Cited by the Examiner
UNITED STATES PATENTS
3,140,794   7/1964   Arndt et al. _____ 220—44

THERON E. CONDON, *Primary Examiner.*

G. T. HALL, *Assistant Examiner.*